US007685307B2

(12) United States Patent
Breen

(10) Patent No.: US 7,685,307 B2
(45) Date of Patent: Mar. 23, 2010

(54) METHOD AND APPARATUS FOR BINDING TRANSCEIVERS OF TELEMATIC DEVICES

(75) Inventor: Thomas Bernard Breen, Broomall, PA (US)

(73) Assignee: Asset Intelligence, LLC, Hackensack, NJ (US)

( * ) Notice: Subject to any disclaimer, the term of this patent is extended or adjusted under 35 U.S.C. 154(b) by 691 days.

(21) Appl. No.: 11/648,236

(22) Filed: Dec. 29, 2006

(65) Prior Publication Data

US 2008/0157944 A1 Jul. 3, 2008

(51) Int. Cl.
*G06F 15/173* (2006.01)
*G05B 11/01* (2006.01)
*G08B 21/00* (2006.01)

(52) U.S. Cl. .................. 709/237; 340/310.11; 340/431; 340/687

(58) Field of Classification Search ................. 709/206, 709/229, 237; 340/310.11, 431, 687; 455/3.01, 455/151.2
See application file for complete search history.

(56) References Cited

U.S. PATENT DOCUMENTS 5,900,803 A 5/1999 Politz et al.
5,905,433 A 5/1999 Wortham
5,917,433 A * 6/1999 Keillor et al. ............... 340/989
6,512,455 B2 * 1/2003 Finn et al. ................ 340/572.1
6,519,529 B2 * 2/2003 Doyle ......................... 701/213
6,799,814 B2 * 10/2004 Lesesky et al. ......... 303/122.02
7,005,985 B1 * 2/2006 Steeves ................... 340/572.1
7,307,514 B2 * 12/2007 McAden ..................... 340/431
7,336,159 B2 * 2/2008 Fackrell et al. .............. 340/431
2002/0030590 A1 3/2002 Dieckmann et al.
2003/0235172 A1 * 12/2003 Wood ......................... 370/338
2005/0016787 A1 1/2005 Lesesky et al.
2007/0046459 A1 * 3/2007 Silverman et al. ...... 340/539.13

* cited by examiner

*Primary Examiner*—Saleh Najjar
*Assistant Examiner*—Vitali Korobov
(74) *Attorney, Agent, or Firm*—Lowenstein Sandler PC

(57) ABSTRACT

A method and apparatus for binding a first wireless communication unit installed on a first asset and a second wireless communication unit installed on a second asset, wherein the first asset is connected to the second asset by electrical power lines. The method and system can be used for binding a wireless communication unit of a tractor and a wireless communication unit on a trailer. The method monitors the current in the auxiliary power connection between the assets. By transmitting and detecting power pulses through the auxiliary power line, the wireless communication units can ensure that the two assets are attached and therefore it would be proper to establish a wireless connection between the two wireless communication units. The number of power pulses can be used to identify differing devices. Such method can also be used to detect an open fuse or circuit breaker. In the case of an open fuse, voltages can be used in place of power pulses to complete the binding process.

26 Claims, 2 Drawing Sheets

METHOD AND APPARATUS FOR BINDING TRANSCEIVERS OF TELEMATIC DEVICES

FIELD OF THE INVENTION

This invention relates to a method and apparatus for binding wireless communications units of telematics systems.

BACKGROUND OF THE INVENTION

The use of telematics systems on assets to track the assets is common among companies that have a fleet of vehicles, for example, tractors and trailers. Typically, telematics systems include components such as communication units, processors, devices for inputs and outputs, and various sensors. Many of these telematics systems involve components that are installed on both the tractor and the trailer. It would be desirable to establish communications between the telematics systems on a tractor with the telematics system on a trailer to exchange various information. For example, such communications would be useful in determining which tractor is attached to which trailer. Frequently, wireless communications units are installed on the tractor and trailer as the means of communication between the tractor and the trailer.

Basic data transfer systems for transmitting information between a pulling vehicle and a trailer are known. One such system is disclosed in U.S. Pat. No. 5,854,517. This system involves establishing a wired communication link between a tractor and a trailer by utilizing certain existing dormant tractor and trailer circuitry. In one embodiment of this system, a tractor communications device has a communications port connected to the turn signal circuit and a trailer communications device has a communications port connected to the same turn signal circuit. The two communications devices permit communications between the tractor and the trailer over the turn signal circuit as long as the turn signal circuit is inactive. Conversely, if the turn signal circuit becomes active, it would inhibit the communications between the tractor and the trailer.

Accordingly, this type of prior art system can only allow communications between a tractor and a trailer when the particular circuitry is not in use and, therefore, communications are cut off when the particular circuitry is in use. Moreover, this system consumes valuable resources of the wired circuitry to support the communications between the tractor and the trailer.

Other types of wired communications devices are disclosed in U.S. Pat. Nos. 5,142,278, 5,025,253 and 4,897,642. These patents disclose systems that would transfer data between the tractor and the trailer using existing power lines connected between the tractor and the trailer. However, the systems disclose in these patents have three major problems. First, these systems require additional components to be installed on both the tractor and the trailer, thereby increasing the costs for operation, making it uneconomical to utilize these systems. Second, because most telematics systems installed on tractors and trailers already have wireless communication capabilities, it would be redundant to add a second means of communication between the tractor and the trailer. Third, wireless transfer of data, for example, by RF, is much faster than wired transfer of data through a power line connecting the tractor and the trailer. Thus, it would be much more efficient to use the wireless communication devices that are already available on telematics systems installed on tractors and trailers, instead of using power lines to transfer data.

In order to avoid some of the problems arise from wired communications systems using existing circuitries, a wireless data transfer system for a tractor and a trailer is disclosed in U.S. Pat. No. 7,142,098. The U.S. Pat. No. 7,142,098 patent discloses a wireless data transfer system having a first and a second wireless communications units carried across a hitch space between the rear of a tractor cab and the front of the trailer. The two wireless communications units transmit data from sensors in the trailer across the hitch space to a notification device in the tractor. This communication system eliminates the use of connection wires and hence avoid the problems of wired communication systems.

However, a problem that can arise from the prior art wireless communication system is the incorrect binding of wireless communications units. If a number of tractors and trailers are in close proximity, for example, in a tractor-trailer parking lot, the wireless communications units may communicate with the incorrect tractor or trailer, resulting in errors in communication. Thus, there is a need for a wireless tractor-trailer binding system to ensure that the telematics system on the tractor would be communicating to the telematics system on the correct trailer, and vice versa. At the same time, the binding method needs to be sufficiently simple to prevent excess consumption of resources. The present invention provides a method of fast and simplified tractor-trailer wireless binding that can minimize false tractor and trailer wireless links.

The present invention uses components that are already installed on tractors and trailers, eliminating the need to install additional components. In addition, the present invention does not transfer data between power lines connecting the tractor and the trailer, thereby eliminating the redundancy of multiple means of communication. At the same time, the present invention provides fast data transfer through the wireless communications devices already installed in the telematics systems. And because the present invention utilizes power pulses, it is also capable of detecting loss of ABS/EBS power, allowing the telematics system to generate alarms promptly and accurately.

BRIEF DESCRIPTION OF THE INVENTION

The present invention provides a method and apparatus for binding a wireless communications unit of a tractor and a wireless communications unit of a trailer. A telematics system on a tractor intending to transfer information with a trailer needs a way of determining when it should bind to the trailer's wireless communications unit. A binding signal provides the needed indicator for the wireless communications unit on the tractor to ensure it is communicating with the wireless communications unit (of the telematics system) on the correct trailer, i.e. the trailer that is attached to the tractor. In the absence of a binding signal, the wireless communications units on the tractors may attempt to establish a connection with the wireless communications units on other tractors or trailers, causing miscommunication between the tractors and their attached trailers.

Typically, telematics systems include components such as communication units, processors and various sensors. For the purpose of this invention, the term "telematics system" is meant to cover any system that has a communication unit, a processor, and sensor inputs that could be used to practice the invention. To practice the invention, a system need not be a formal telematics system, any systems with communication units, processors and sensors can be used to practice the invention.

The present invention uses the telematics system on a tractor or trailer to monitor the current in the auxiliary power connection between the tractor and the attached trailer. In an illustrative implementation, the detected power draw of an attached trailer indicates the potential presence of a wireless device that is capable of establishing a link. Specifically, when a trailer is connected, power is drawn by the trailer and this power draw is indicative of a connection with a trailer.

Upon detection of the power draw, the tractor's telematics system would cause its wireless communications device to search for a wireless communications unit in the trailer in an attempt to establish a connection. Similarly, the process could be initiated by the telematics system in the trailer, in which case that system would cause the trailer's communications device to attempt to establish a connection with a tractor's communications device after a power draw is detected.

In another illustrative implementation, the telematics system on a trailer may cause power pulses of a short duration on the auxiliary power line to indicate the presence of a wireless device that is capable of establishing a link. Different number of power pulses can be used to identify different communication devices. Upon detecting such power pulses from the trailer, the tractor's telematics system can cause its communications device to establish connections with one or more communication devices on the trailer.

In addition to providing a wireless tractor-trailer binding signal, in another illustrative implementation, the telematics system can monitor the voltage drop across a fuse or circuit breaker and generate an alarm for the open fuse or circuit breaker. An open fuse or circuit breaker is indicative of loss of power to the trailer telematics system and/or ABS/EBS units. Even if the fuse or circuit breaker is open, the telematics system can still obtain correct binding between the wireless communications units of the tractor and the trailer by monitoring the voltage drop across the fuse or circuit breaker.

BRIEF DESCRIPTION OF THE DRAWINGS

The method and apparatus for binding wireless communications units of telematics systems are further described with reference to the accompanying drawings in which.

DETAILED DESCRIPTION OF THE INVENTION

Figure 1:
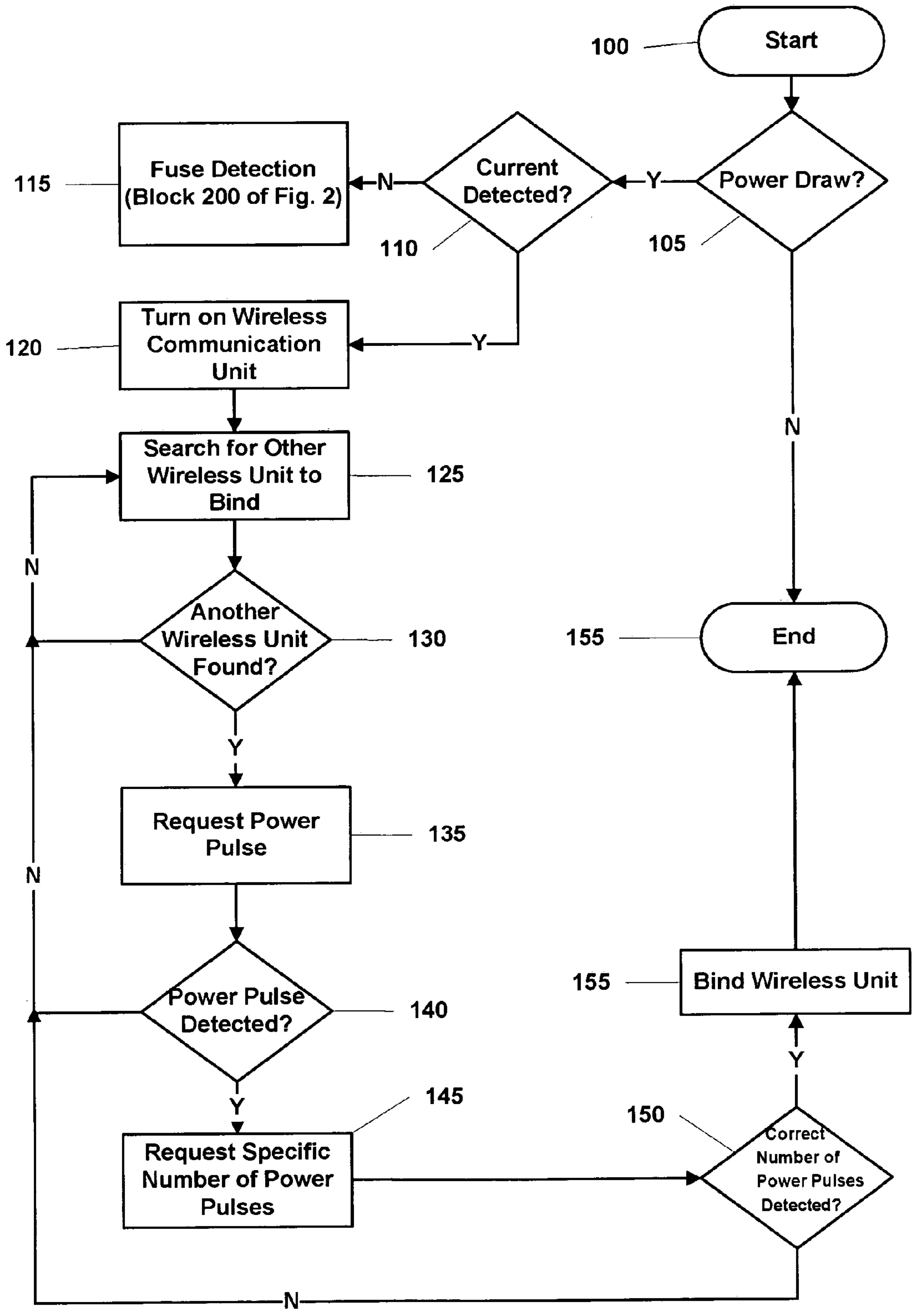
FIG. 1 is a flow diagram of the processing performed in an illustrative operation in accordance with the herein described methods.

The present invention provides a method of binding a wireless communications unit on a tractor to a wireless communications unit on a trailer and to ensure that the tractor is establishing communication with the correct trailer. For illustrative purposes, the binding system herein described is used for binding a communications unit on a tractor to a communications unit on a trailer. However, the binding system can be used for binding communications units on assets other than tractors and trailers. In fact, the binding system can be used for binding wireless communication units on any assets with power line connections.

In one illustrative implementation, the telematics system on a tractor detects the presence of a power draw by a trailer and determines that a trailer is attached to the tractor. This power draw detection process can be performed by either the tractor's or trailer's telematics system; for illustrative purposes, the power draw detection process herein described is initiated by the tractor's telematics system. When a trailer is attached to a tractor, the tractor connects one or more power cables to the trailer and the trailer draws power from the tractor. The tractor's telematics system would detect a power draw from the tractor by the trailer, and would thereby determine that a trailer has been attached to the tractor. For example, if the tractor's telematics system detects a current flow, the tractor would determine that a trailer is attached to the tractor. On the other hand, if the tractor's telematics system does not detect a current flow, it does not necessarily mean that no trailer is attached to the tractor. There is a possibility that a trailer is attached to the tractor, but there is no current flow because a fuse or circuit breaker is open. Therefore, the system may proceed to a fuse detection process to determine if a fuse or circuit breaker is open. The current flow may be measured and/or detected using a current meter or any other current measuring devices. In addition, the current measuring device may be installed as either an internal component of the telematics system or as an external component of the telematics system.

After detecting the presence of a trailer, the system would turn on the tractor's wireless communications unit. The wireless communications unit on the tractor would then start searching for other wireless communications unit(s) to form a communication connection with. When the wireless communications unit on the tractor detects another wireless communications unit, the handshake process begins. This handshake process can be initiated by either the tractor or the trailer, for illustrative purposes, the handshake process herein described would be initiated by the tractor.

First, the telematics system on the tractor would cause its wireless communications unit to send one or more requests for one or more power pulses to the other wireless communications units. Power pulses are typically characterized by an increase or decrease in current or voltage on power lines. The other wireless communications unit would receive this request and its telematics system would then instruct its trailer, i.e. the trailer on which the other wireless communications unit is installed, to apply one or more power pulses through the auxiliary power connection to the tractor. The power pulses may be pulses in current or voltage caused by the application or withdrawal of current or voltage to the auxiliary power connection. These power pulses would be narrow so as to avoid tripping a circuit breaker or fuse.

Afterwards, the telematics system on the tractor would attempt to detect any power pulses coming from the auxiliary power connection. The power pulses may be pulses in current or voltage caused by the application or withdrawal of current or voltage to the auxiliary power connection. The power pulses may be measured and/or detected using one or more current and/or volt meters or any other current and/or voltage measuring devices, depending on whether current or voltage is varied to induce the power pulse. In addition, the current and/or voltage measuring device may be installed as either an internal component of the telematics system or as an external component of the telematics system. If no power pulses are detected, the tractor's telematics system would determine that particular wireless communications unit does not belong to the trailer that is attached to the tractor. The tractor's telematics system tractor would then start searching for a different wireless communications unit, and the process starts from the beginning again.

In another illustrative implementation, if one or more power pulses are detected, the tractor's telematics system may proceed to verify if its wireless communications unit is indeed establishing a connection with the wireless communications unit on the correct trailer, i.e. the trailer that is attached to the tractor. Similar to the handshake process, the verification process can be initiated by either the tractor's or the trailer's telematics system. For illustrative purposes, the verification process herein described would be initiated by the tractor's telematics system.

The tractor's telematics system would cause its wireless communications unit to send one or more requests to the other wireless communications units for a specific number of power pulses. Upon receiving such request or requests, the attached trailer's telematics system would then cause the specific number of power pulses to be sent through the auxiliary power connection to the tractor. For example, the wireless communications unit on the tractor may send a request for five (5) power pulses. After receiving the request, the second wireless communications unit would then instruct its trailer to send five (5) power pulses through the auxiliary power connection.

If the number of power pulses detected by the tractor's telematics system is the same as the number of power pulses requested by the system, the tractor's telematics system would determine that its wireless communications unit is indeed communicating with the wireless communications unit on the correct trailer, i.e. the trailer that is attached to the tractor. If the number of power pulses detected by the tractor's telematics system is not the same as the number of power pulses requested by the tractor, the tractor's telematics system would determine that its wireless communications unit is not communicating with the wireless communication on the correct trailer. The tractor's telematics system would then revert to the searching process to search for a different wireless communications unit.

In another illustrative implementation, the verification process may be performed using variations of time periods between power pulses. Similar to the handshake process, the verification process can be initiated by either the tractor's or the trailer's telematics system. For illustrative purposes, the verification process herein described would be initiated by the tractor's telematics system.

The tractor's telematics system would cause its communications system to send one or more requests to the other wireless communications unit for power pulses with specific time periods between them, i.e. power pulses in certain specific intervals. For example, the tractor's telematics system may send a request for power pulses that are two (2) seconds apart. If the time periods between power pulses detected by the tractor's telematics system is the same as the time periods requested, the tractor's telematics system would determine that its wireless communications unit is indeed communicating with the wireless communications unit on the correct trailer, i.e. the trailer that is attached to the tractor. If the time periods between power pulses detected by the tractor's telematics system is not the same as the time periods requested, the tractor's telematics system would determine that its wireless communications unit is not communicating with the wireless communication on the correct trailer. The tractor's telematics system would then revert to the searching process to search for a different wireless communications unit.

Once the verification process is completed and the tractor's telematics system determines that its wireless communications unit is communicating with the wireless communications unit on the correct trailer, the tractor's telematics system can proceed to bind its wireless communications unit with the trailer's wireless communications unit. The binding process can be performed by locking one or more frequencies on which the wireless communications units on the tractor and the trailer would communicate. For example, the wireless communications units on the tractor and the trailer would only transmit and/or receive signals of a certain frequency. Depending on the types of wireless communications units installed, other means of binding may also be used.

In one illustrative implementation, the process would follow the flow diagram shown in FIG. 1. The process can be initiated by either the tractor's or the trailer's telematics system. For illustrative purposes, the flow diagram depicts the binding process that is initiated by the tractor's telematics system.

As shown in FIG. 1, processing begins at block 100 and proceeds to block 105, where a check is performed to determine whether there is a power draw by a trailer from a tractor. If the check determines that power is drawn, processing proceeds to block 110, where a check is performed to determine if there is a current flow. If the check at block 110 determines that there is no current flow or negligible current flow, processing proceeds to block 115, where a fuse detection process is performed. The fuse detection process is described in further detail in FIG. 2, and begins from block 200 of FIG. 2.

If the check at block 110 indicates that there is a current flow, processing proceeds to block 120, where the wireless communications unit on the tractor is turned on. Processing then proceeds to block 125.

Beginning at block 125, a search for other wireless communications units is performed, and processing proceeds to block 130. At block 130, a check is performed to determine whether a second wireless communications unit is found. If a second wireless communications unit is not found, processing would revert back to block 125, where the search for a second wireless communications unit continues.

If a second wireless communications unit is found, processing proceeds to block 135, where one or more requests for one or more power pulses are transmitted. Upon receiving the request for power pulses, the telematics system for the second wireless communications unit would cause the transmission of power pulses through the auxiliary power line. Processing then proceeds to block 140, where a check is performed to determine if any power pulses are detected. If no power pulses are detected, indicating that the wireless communications unit on the tractor is not communicating with the wireless communications unit on the correct trailer, i.e. the trailer that is attached to the tractor, the process would revert back to block 125, where the search for another wireless communications unit would continue.

If power pulses are detected, indicating that the wireless communications unit on the tractor is communicating with the wireless communications unit on the correct trailer, the process would proceed to block 145, where the verification process would begin.

At block 145, one or more requests for a specific number of power pulses are transmitted. Upon receiving the request, the telematics system for the second wireless communications unit would cause the transmission of the specified number of power pulses, i.e. the same number of power pulses as requested by the tractor's telematics system. Processing then proceeds to block 150, where a check is performed to determine whether the number of power pulses detected is the same as the number of power pulses requested. If the number of power pulses detected is not the same as the number of power pulses requested, indicating that the verification is not successful, processing would then revert back to block 125, where the search for a wireless communications unit would continue.

If the number of power pulses detected is the same as the number of power pulses requested, indicating that the verification is a success, processing would proceed to block 155. At block 155, the wireless communications unit on the tractor would bind the wireless communications unit on the trailer. The binding process can be done in several ways. For example, the wireless communications units may be locked on one or more frequencies exclusively for communications between the tractor and the trailer, i.e. the wireless communications units would only transmit and/or receive signals on the chosen frequencies. Other means of binding can also be employed base on the types of wireless communications units and telematics systems installed. The process then ends at block 155.

The verification process may be performed using other characteristics associated with power pulses, not just the number of power pulses. For example, the request may be for specific time periods between power pulses. In that case, at block 145, a request for one or more specific time periods between power pulses would be transmitted. Upon receiving the request, the telematics system of the second wireless communications unit would cause the transmission of power pulses with the specified time periods between them, the same time periods as requested by the tractor. Processing then proceeds to block 150, where a check is performed to determine whether the time periods between power pulses detected is the same as the time periods requested. If the time periods detected is not the same as the time periods requested, indicating that the verification is not successful, processing would revert back to block 125 and proceed from there. If the time periods detected is the same as the time periods requested, indicating that the verification is a success, processing would continue to block 155 and proceed from there.

As previously discussed, if the tractor's telematics system does not detect a current flow, it may proceed to a fuse detection process to determine if a fuse or circuit breaker is open. An open fuse or circuit breaker is indicative that the telematics systems on the trailer is running on battery power, meaning that various actions need to be taken to conserve power. In addition, an open fuse or circuit breaker is indicative that the anti-brakelock system (ABS) is not powered properly, which presents potential risk in the operation of the vehicle. An alarm would be generated for an open fuse or circuit breaker so that the problem can be properly rectified. If the fuse detection process detects an open fuse or circuit breaker, the system can still continue the tractor and trailer binding process by monitoring the voltage instead of power pulses. The fuse detection process may be performed by either the tractor's or the trailer's telematics system, for illustrative purposes, the process herein described is initiated by the tractor's telematics system.

If no current is detected, the system would proceed to detect whether there is a voltage drop across the fuse or circuit breaker. Normally, if there is no current, at the same time there would be nominal or no voltage drop. However, if there is a voltage drop across the fuse or circuit breaker but no current is present, it is indicative of a blown fuse or an open circuit breaker. Therefore, if a voltage drop is detected, the system would generate an alarm for the detection and presence of a blown fuse or an open circuit breaker on the auxiliary power circuitry. The voltage drop may be measured and/or detected using a volt meter or any other voltage measuring devices. In addition, the voltage measuring device may be installed as either an internal component of the telematics system or as an external component of the telematics system.

After generating the alarm, the system would continue to attempt to bind the wireless communications units of the tractor and the trailer. First, the tractor's telematics system would switch on its wireless communications unit. Once it is switched on, the tractor's wireless communications unit would proceed to search for other wireless communications units to form a communication connection with. When the tractor's wireless communications unit detects another wireless communications unit, the handshake process begins. This handshake process can be initiated by either the tractor or the trailer; for illustrative purposes, the handshake process herein described would be initiated by the tractor.

First, the tractor's telematics system would cause its wireless communications unit to send one or more requests to the other wireless communications units for a specific amount of voltage. Upon receiving such request or requests, the telematics system for the other wireless communications unit would then cause the specified amount of voltage to be applied to the auxiliary power connection to the tractor to which its connected. For example, the tractor's telematics system may cause its wireless communications unit to send a request for three (3) volts. After receiving the request, the telematics system for the second wireless communications unit would cause three (3) volts to be applied to the auxiliary power line to the trailer to which it is connected.

If the amount of voltage detected by the tractor's telematics system is the same as the amount of voltage requested, the tractor would determine that its wireless communications unit is indeed communicating with the wireless communications unit on the correct trailer, i.e. the trailer that is attached to the tractor. The telematics system on the tractor would then proceed to bind the wireless communications unit on the trailer. If the amount of voltage detected at the tractor is not the same as the amount of voltage requested by the tractor's telematics system, the tractor's telematics system would determine that its wireless communications unit is not communicating with the wireless communications unit on the correct trailer. The tractor's telematics system would then revert to the searching process to search for a different wireless communications unit.

Figure 2:
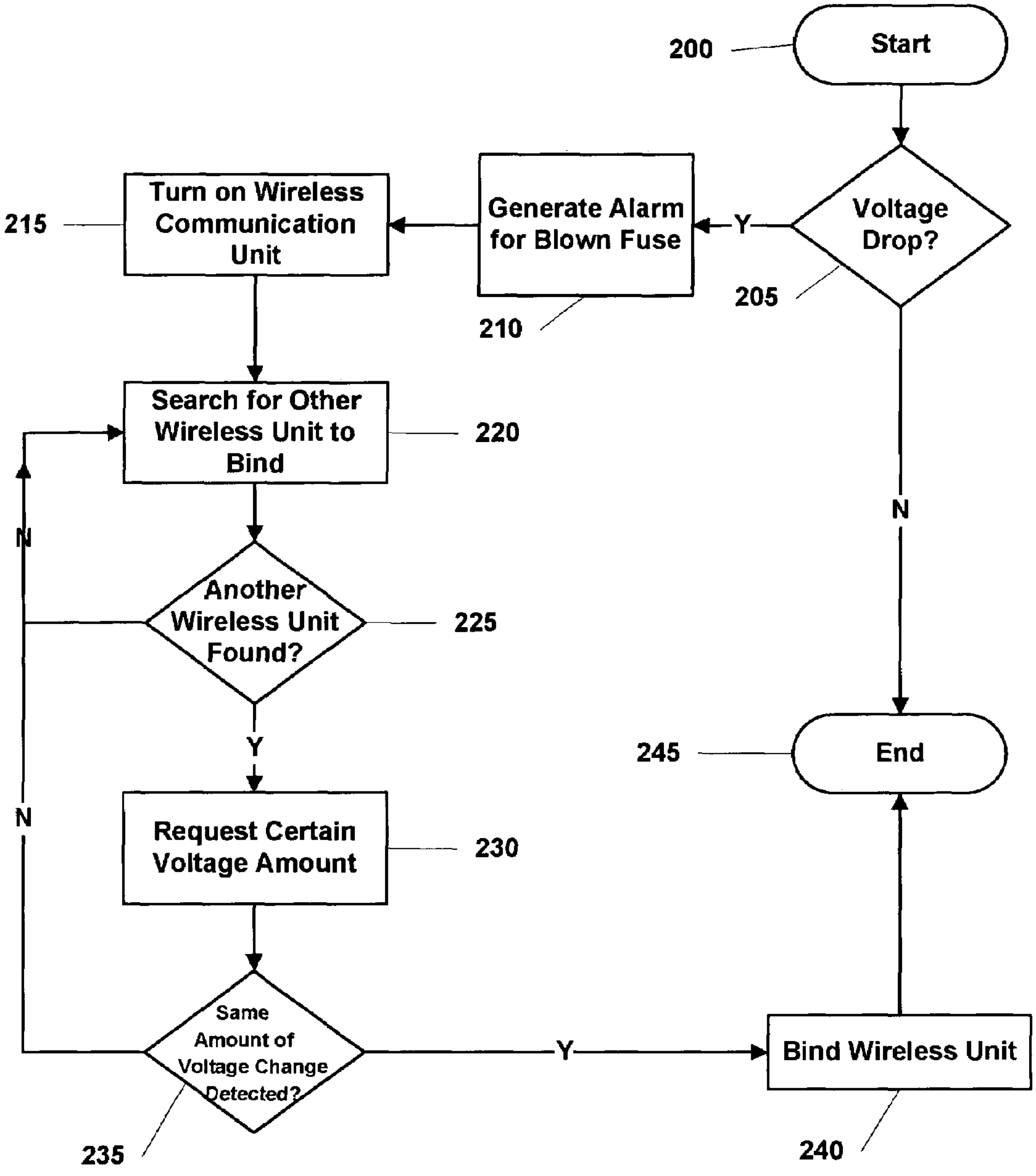
FIG. 2 is a flow diagram of the fuse detection process shown in FIG. 1.

In one illustrative implementation, the fuse detection process would follow the flow diagram shown in FIG. 2. The process can be initiated by either the tractor's or the trailer's telematics system, for illustrative purposes, the flow diagram depicts the fuse detection process that is initiated by the tractor's telematics system.

As shown in FIG. 2, processing begins at block 200 and proceeds to block 205, where a check is performed to determine whether there is a voltage drop across the fuse or circuit breaker. If the check at block 205 determines that there is no voltage drop across the fuse or circuit breaker, indicating that there is no blown fuse or open circuit breaker, the process proceeds to block 245 and ends. If the check at block 205 determines that there is a voltage drop across the fuse or circuit breaker, indicating that there is a blown fuse or open circuit breaker, processing proceeds to block 210.

At block 210, the telematics system generates an alarm for blown fuse or open circuit breaker and processing proceeds to block 215, where the wireless communications unit on the tractor is switched on. Processing then proceeds to block 220.

Beginning at block 220, a search for other wireless communications units is performed, and processing proceeds to block 130. At block 130, a check is performed to determine whether a second wireless communications unit is found. If a second wireless communications unit is not found, processing would revert back to block 220, where the search for a second wireless communications unit continues.

If a second wireless communications unit is found, processing proceeds to block 230, where the handshake process would begin. At block 230, one or more requests for one or more specific amounts of voltage are transmitted. Upon receiving the request or requests for voltage, the telematics system for the second wireless communications unit would cause the specific amounts of voltage to be applied to the auxiliary power line. Processing then proceeds to block 235, where a check is performed to determine whether the amount of voltage detected is the same as the amount of voltage requested. If the amount of voltage detected is not the same as the amount of voltage requested, indicating that the handshake process is not successful, processing would then revert back to block 220, where the search for a wireless communications unit would continue.

If the amount of voltage detected is the same as the amount of voltage requested, indicating that the handshake process is a success, processing would proceed to block 240. At block 240, the tractors telematics system would bind the wireless communications unit on the tractor and trailer. Processing then ends at block 245.

It is understood that the herein described systems and methods are susceptible to various modifications and alternative constructions. There is no intention to limit the invention to the specific constructions described herein. To the contrary, the invention is intended to cover all modifications, alternative constructions, and equivalents falling within the scope and spirit of the invention.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A method of binding a first wireless communication unit of a first telematics system of a first asset to a second wireless communications unit of a second telematics system of a second asset, wherein the first asset and second asset are electrically connected, comprising the steps of:

(a) establishing communications between the first wireless communications unit and an other wireless communications unit of an other telematics system on an other asset within communication range of said first asset;

(b) sending via the first wireless communications unit to the other communications unit a request for the other telematics system to apply one or more requested power pulses to one or more power lines connected to the other telematics system;

(c) receiving said request at said other wireless communications unit;

(d) said other wireless telematics system applying the requested power pulses through the one or more power lines connected to said other telematics system;

(e) detecting at said first telematics system any pulses applied on said one or more power lines to which the first telematics system is connected electrically to the second telematics system; and (f) if the requested pulses are detected by the first telematics system, thus confirming that the other wireless communications system is the second wireless communications system of the second telematics system that is connected electrically to the first telematics system, binding the first wireless communications unit of the first telematics system to the other wireless communications unit of the other telematics system;

wherein said first asset is a trailer and said second asset is a tractor, or said first asset is a tractor and said second asset is a trailer.

2. The method of claim 1, further comprising:

performing steps (a) through (f) until binding of the first wireless communications unit to the second wireless communications unit has occurred or until communications have been established with all available wireless communications units and binding has not occurred.

3. The method of claim 1, further comprising:

determining whether said first asset is connected electrically to a second asset; and wherein establishing communications between the first wireless communications unit and an other wireless communications unit is only performed if it is determined that the first asset is electrically connected to the second asset.

4. The method of claim 3, wherein determining whether said first asset is connected electrically to a second asset is performed by detecting at the first telematics system whether there is a power draw in said one or more power lines connecting said first asset and said second asset.

5. The method of claim 3, wherein determining whether said first asset is connected electrically to a second asset is performed by detecting using the first telematics system whether there is a current flow in said one or more power lines connecting said first asset and said second asset.

6. The method of claim 1:

wherein sending a request for one or more power pulses comprises sending a request for at least two power pulses with one specific time period in between said pulses;

wherein said other wireless telematics system applying one or more power pulses comprises applying at least two power pulses with one specific time period in between said pulses; and wherein determining whether said power pulses received by said first telematics system match said requested power pulses includes determining whether the time period between pulses received matches the requested time period between pulses.

7. The method of claim 1:

wherein sending a request for one or more power pulses comprises sending a request for a specific number of power pulses;

wherein said other wireless telematics system applying one or more power pulses comprises applying the specific number of power pulses; and wherein determining whether said power pulses received by said first telematics system match the specific number of power pulses requested includes determining whether the specific number of power pulses was received.

8. The method of claim 1, wherein said binding further comprises:

setting one or more frequencies on which said first and second wireless communications units communicate with each other.

9. The method of claim 1, wherein said power pulse is applied by causing current to flow in one or more of the power lines connected to the other telematics system.

10. The method of claim 1, wherein said power pulse is applied by causing voltage to be applied to one of more of the power lines connected to the other telematics system.

11. The method of claim 10, wherein detecting at said first telematics device comprises detecting voltage across a fuse or circuit breaker on said one or more of the power lines to which the first telematics system is connected to the second telematics system.

12. The method of claim 1, further comprising determining whether an open circuit condition exists on the electrical connection between the first asset and second asset;

wherein said power pulse is applied by applying voltage to one or more of the power lines connected to the other telematics system if an open circuit condition exists; and wherein said power pulse is applied by applying current to one or more of the power lines connected to the other telematics system if an open circuit condition does not exist.

13. The method of claim 12, wherein determining whether an open circuit condition exists on the electrical connection between the first asset and second asset comprises:

detecting using the first telematics system whether there is a current flow in said one or more power lines connecting said first asset and said second asset;

detecting using the first telematics system whether there is a voltage drop across a fuse or circuit breaker in said one or more power lines connecting said first asset and said second asset; and determining that an open circuit condition exists if no current flow is detected and a voltage drop is detected.

14. A system for binding a first wireless communications unit of a first telematics system installed on a first asset to a second wireless communications unit of a second telematics system installed on a second asset, wherein the first asset and second asset are electrically connected, comprising:

(a) a first wireless communications unit for establishing communication with an other wireless communications unit of an other telematics system on an other asset within communication range of said first asset;

sending a request for one or more power pulses to said other wireless communications unit;

(b) said other wireless communications unit for receiving said request from said first wireless communications unit;

(c) said other telematics system for receiving said request from said other wireless communications unit; and for applying one or more power pulses through one or more power lines connected to said other telematics system;

wherein said first telematics system detects any pulses applied on said one or more power lines to which the first telematics system is connected electrically to the second telematics system; and wherein said first telematics system binds the first wireless communications unit to the other wireless communications unit if the first telematics system detects the requested pulses, which confirms that the other wireless communications system is the second wireless communications system of the second telematics system that is connected electrically to the first telematics system; and wherein said first asset is a trailer and said second asset is a tractor, or said first asset is a tractor and said second asset is a trailer.

15. The system of claim 14, wherein said first telematics system attempts to bind the first wireless communications unit with another wireless communications unit until binding of the first wireless communications unit to the second wireless communications unit has occurred or until communications have been established with all available wireless communications units and binding has not occurred.

16. The system of claim 14, wherein:

said first telematics system also determines whether said first asset is connected electrically to a second asset; and wherein said first telematics system only establishes communications between the first wireless communications unit and an other wireless communications unit if said first telematics system determines that the first asset is electrically connected to the second asset.

17. The system of claim 16, wherein said first telematics system determines whether said first asset is connected electrically to a second asset by detecting whether there is a power draw in said one or more power lines connecting said first asset and said second asset.

18. The system of claim 16, wherein said first telematics system determines whether said first asset is connected electrically to a second asset by detecting whether there is a current flow in said one or more power lines connecting said first asset and said second asset.

19. The system of claim 16:

wherein said first wireless communications unit sending a request to said other wireless communications unit comprises said first wireless communications unit sending a request for at least two power pulses with one specific time period in between said pulses; and wherein said first telematics system binds the first wireless communications unit to the other wireless communications unit if the first telematics system detects the requested power pulses including the time period between pulses.

20. The system of claim 14:

wherein said first wireless communications unit sending a request to said other wireless communications unit comprises said first wireless communications unit sending a request for a specific number of power pulses; and wherein said first telematics system binds the first wireless communications unit to the other wireless communications unit if the first telematics system detects the specific number of power pulses.

21. The system of claim 14, wherein said binding further comprises:

said first telematics system setting one or more frequencies on which said first and second wireless communications units communicate with each other.

22. The system of claim 14, wherein said other telematics system applies a power pulse through one or more power lines connected to said other telematics system by causing current to flow in one or more of the power lines connected to the other telematics system.

23. The system of claim 14, wherein said other telematics system applies a power pulse through one or more power lines connected to said other telematics system by causing voltage to be applied to one of more of the power lines connected to the other telematics system.

24. The system of claim 23, said first telematics system detects any pulses applied comprises said first telematics system detecting voltage across a fuse or circuit breaker on said one or more of the power lines to which the first telematics system is connected to the second telematics system.

25. The system of claim 14, further comprising said first telematics system determining whether an open circuit condition exists on the electrical connection between the first asset and second asset;

wherein, if an open circuit condition exists, said other telematics system applies a power pulse through one or more power lines connected to said other telematics system by causing voltage to be applied to one of more of the power lines connected to the other telematics system;

and wherein, if an open circuit condition does not exist, said power pulse is applied by causing current to flow in one or more of the power lines connected to the other telematics system.

26. The system of claim 25, wherein said first telematics system determining whether an open circuit condition exists on the electrical connection between the first asset and second asset comprises:

said first telematics system detecting whether there is a current flow in said one or more power lines connecting said first asset and said second asset;

said first telematics system detecting whether there is a voltage drop across a fuse or circuit breaker in said one or more power lines connecting said first asset and said second asset; and said first telematics system determining that an open circuit condition exists if no current flow is detected and a voltage drop is detected.

* * * * *